United States Patent [19]

Pustka

[11] 4,240,853

[45] Dec. 23, 1980

[54] LENS CLOSURE FOR LIGHT FIXTURE AND METHOD FOR ATTACHMENT

[75] Inventor: Marvin J. Pustka, New Braunfels, Tex.

[73] Assignee: Esquire, Inc., New York, N.Y.

[21] Appl. No.: 953,271

[22] Filed: Oct. 20, 1978

[51] Int. Cl.³ .......................... E06B 3/60; F21V 11/00; G03B 15/02

[52] U.S. Cl. .......................... 156/108; 156/290; 156/291; 156/292; 156/293; 156/306.6; 156/313; 156/329; 362/306; 362/267; 362/368; 428/83; 428/122; 428/192; 428/422; 428/447; 428/450; 428/451; 427/163; 427/164; 427/165

[58] Field of Search .......................... 156/108, 290–293, 156/329, 309, 313; 428/83, 122, 192, 34, 422, 447, 450, 451; 362/306, 267, 353, 310, 311, 368, 369; 427/163–165

[56] References Cited

U.S. PATENT DOCUMENTS

| | | | |
|---|---|---|---|
| 3,527,013 | 9/1970 | Kruschwitz | 428/83 |
| 3,549,466 | 12/1970 | Kay | 428/192 |
| 3,784,807 | 1/1974 | Boekkoi | 362/267 |
| 3,812,342 | 5/1974 | McNamara | 362/375 |
| 3,879,241 | 4/1975 | Butler | 156/108 |
| 3,896,302 | 7/1975 | Whitney | 362/310 |
| 3,955,021 | 5/1976 | Cleavenger | 428/192 |
| 3,968,612 | 7/1976 | Endo | 156/108 |
| 4,120,023 | 10/1978 | McReynolds | 362/16 |

FOREIGN PATENT DOCUMENTS

| | | | |
|---|---|---|---|
| 1188633 | 4/1970 | United Kingdom | 428/122 |

OTHER PUBLICATIONS

J. T. Barnes, "Plastics - Pros and Cons For Outdoor Lighting," *Lighting Design and Application*, Dec., 1972, pp. 29–31.

*Primary Examiner*—Ellis P. Robinson
*Attorney, Agent, or Firm*—Frank S. Vaden, III

[57] ABSTRACT

An enclosure for a light fixture and the method for making such an enclosure via the securement of a plastic or glass lens, wherein the light fixture has a window which does not have to be opened in normal use for replacement of bulb, but is normally accessible through a rear or side opening. The window opening is circumscribed with a front flange projecting radially outward. A double sided adhesive tape is affixed to the flange and is united with the lens. A metal cored trim covers and secures the flange and the unified tape-and-lens structure. This latter assembly may be further secured by crimping.

10 Claims, 3 Drawing Figures

FIG. 1
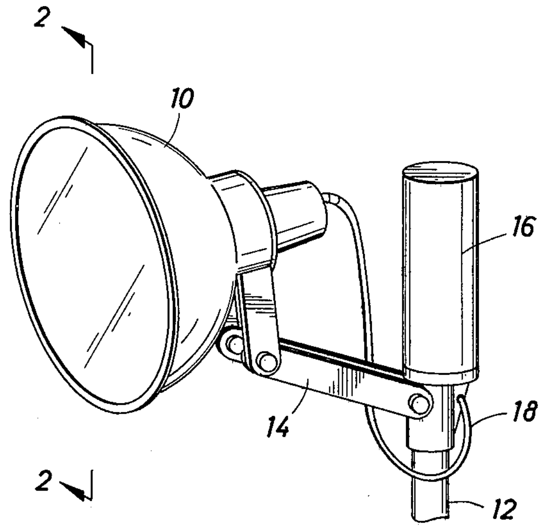
FIG. 2
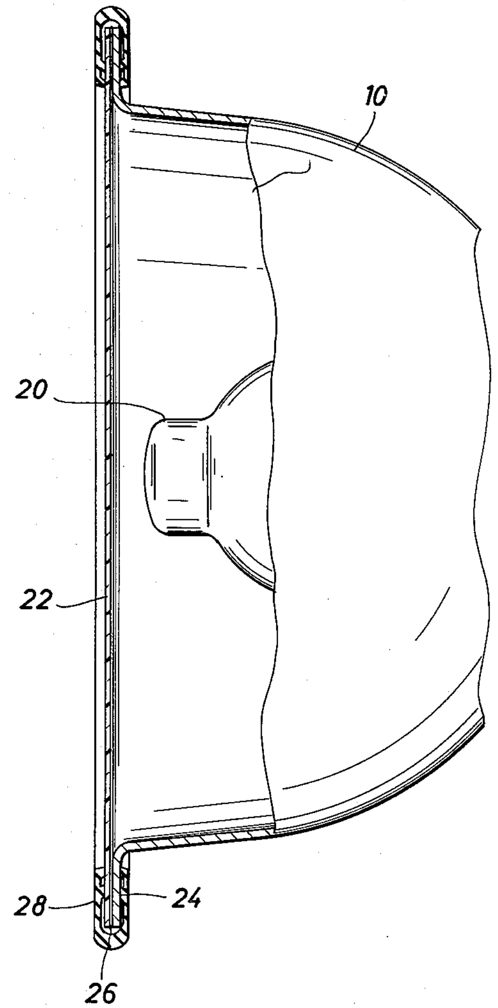
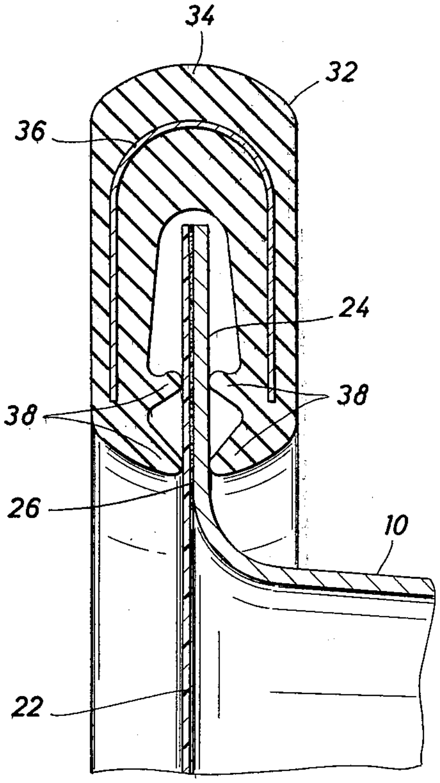
FIG. 3

LENS CLOSURE FOR LIGHT FIXTURE AND METHOD FOR ATTACHMENT

BACKGROUND OF THE INVENTION

1. Field of the Invention

This invention pertains to an improved method of securing a plastic or glass lens as a light fixture window lens, where the window lens does not have to be opened for normal maintenance, and to the resulting improved lighting fixture.

2. Description of the Prior Art

Commercial lighting fixtures each enclosing one or more bulbs or lamps usually include a large window opening through which light emanates from the bulbs or lamps. The normal material used for closing this window is clear glass. In some installations frosted or otherwise partially opaque glass is employed to soften or diffuse the light.

In a typical installation of a high intensity discharge lamp, such as a mercury vapor lamp, the window opening closed by a pane of clear glass may be approximately two feet by two feet. The entire lighting fixture may be one of a plurality mounted in a high ceiling over a laboratory, industrial process area, a warehouse of similar area.

Although plastics have been substituted for glass in many applications, such as for canopies of airplanes, contact lenses, lenses for photocells and many, many other applications, previous to the development of the lens described in U.S. Pat. No. 3,812,342, substitution had never been totally satisfactory in the high temperature, prolonged use, often abusive environment that high intensity discharge lamps are subjected to. An article by J. T. Barnes appearing in *Lighting Design & Application,* December 1972, is believed to reflect the state of knowledge as of its publication date. The findings of Barnes is that for short-term use in a high temperature, high ultraviolet environment, there are some coated polycarbonates that might be considered reservedly acceptable. For general low temperature use, some acrylics (such as Plexiglas) are acceptable. For high temperature use (over 105° C.), there was no known substitute for glass. The sole exception was that in extreme breakage areas or hazardous locations with inside temperatures not in excess of 125° C., polycarbonate may be substituted, provided a very limited service life is acceptable. There are so many characteristics besides accommodation to the above that have to come together in a single plastic, that it was a remarkable discovery that any plastic could be suitable. For example, for a clear light fixture lens application, there had to be good optical, low-backscatter properties, not just initially, but after months and even years of use. Since most plastics, and even some fluoroplastics, degrade when exposed to ultraviolet light, the selection of a plastic with acceptable optical properties was extremely difficult. Further, as noted above, the high temperatures attendant to high intensity discharge lamps is also a critical problem pertaining to the selection of a suitable material.

Moreover, unless there was a vast saving in weight, the economics of the substitution did not make any sense. The most common glass substitute for large panes is probably Plexiglas, which is rigid and commonly seven-thirty-seconds inch thick (approximately 5.56 mm.). Because it optically degrades under high temperature conditions and for other reasons, it is not acceptable. Lexan, another sometime glass substitute in other contexts, does withstand high temperatures better than Plexiglas, but it yellows to an objectionable extent.

The primary advantages of glass as a fixture closure or lens include its low cost, its ready availability, its resistance to high operating temperatures, such as emanate from high wattage lamps, its resistance to change in color and opaqueness, even over a prolonged period of time, and its uniform light transmittance qualities over the full range of the visible spectrum.

Glass as a closure for such a fixture has a number of disadvantages, however. First, it is breakable. Should something accidentally strike the glass or should the bulb within the fixture explode, the glass is very likely to break causing not only an inconvenience to the persons working in the area, but also creating a hazard. So-called non-breakable tempered or safety glass is available and is used. But, even tempered glass does break. In such case, beads result, rather than jagged pieces, but even beads can be hazardous.

Further, glass is thought of as being relatively slick and therefore resistant to the build-up of dust. However, as most persons can attest to who have had experience with dust build-up on glass, it really does not take very long for an appreciable amount to accumulate. The rapid accumulation of dust results in reduced illumination from the fixture and a requirement to clean the fixture. The more often someone has to clean the fixture, the more expensive is the maintenance.

The glass used in a fixture such as the one described above is also an appreciable percentage of the overall weight of the fixture. A lighter window closure would effect a reduction in manufacturing and shipping costs.

As previously mentioned, U.S. Pat. No. 3,812,342 reveals an opening or lens structure which is suitable for many types of lighting installations. However, one type of installation which is not covered by the structure there revealed is for a fixture which is entered from the rear for bulb replacement purposes. Such a fixture is prevalent in outdoor sporting installations (e.g., for lighting tennis courts, baseball diamonds, and the like) and is known as a sports light. For purposes hereof, any light fixture which is not entered through the window lens, such as in the manner illustrated in the '342 patent, is referred to as a sports light, regardless of the actual use or installation of such light.

Fluoroplastics, or fluorocarbon polymers, all have the property of having a resistance to high temperatures, being light weight in small thickness and being unbreakable. Some fluoroplastics, and in particular Teflon FEP (a fluorocarbon copolymer made by polymerizing a mixture of tetrafluoroethylene and hexafluoropropylene), have the additional properties of being nearly transparent in thin-film form (no thicker than about 10 mm.), having a high and uniform light-spectrum transmittance, having a long-term aging quality without appreciable discoloring, and having an extremely low coefficient of friction and therefore providing a dust resistant surface. It has been discovered that a lighting fixture closure made of such a material has sufficiently equal or superior qualities in all of its necessary characteristics that it is an overall superior closure to that of glass.

In a lighting fixture which is entered from the rear for bulb replacement, the previous method of securing a fluorocarbon lens to said fixture as described in U.S. Pat. No. 4,120,023, was to stretch a lighting fixture closure in the form of a thin-film transparent lens or window for the fixture over the rim and to squeeze such lens into place preferably using a gasket and a metallic steel band. When the housing of the fixture is aluminum, heat expansion of the fixture during the time the internal light is lit actually tightens the band in place due to the difference between the temperature coefficient of aluminum compared with that of steel.

The manner of securing the fluorocarbon lens on the lighting fixture illustrated in U.S. Pat. No. 4,120,023 has several disadvantages. First, it is difficult to install in that the gasket must be forced over the extended portion of the lens. Second, field reliability of the fixture has been inadequate in that occasional water leakage has been encountered when the lighting system is allowed to cool, since the heat expansion, as previously mentioned, that was utilized to tighten the band is not present when the lighting fixture is not in operation. Third, the cost of utilizing the system described in the '023 patent is high, in that the fluorocarbon lens must extend well past the end of the housing so that it can be totally covered by the gasket rim along with the cost for the difficult job of forcing the closing band back over the rim, gasket and lens.

Although it has been recognized that Teflon FEP could be bonded to adhesives, it has been pure speculation that either Teflon FEP or Teflon TFE (a fluorocarbon homopolymer called polytetrafluoroethylene) or other suitable thin plastic films could actually be suitably secured to a light fixture frame via adhesives. For example, it was not known if such adhesives would so weaken such films so as to cause tearing or to age such films to cause cracking after short use or to cause hardening so that the adhesives would pull loose or that some other problem would be encountered.

It is therefore a feature of this invention to provide an improved method of securing a plastic lens to a sports type of lighting fixture which does not require front entry for maintenance of the light source.

It is another feature of this invention to provide an improved method of securing a plastic lens especially a fluorocarbon lens that extends past the edge of the fixture to an extending rim from a sports type lighting fixture that does not require front entry for maintenance of the light source.

It is a further object of this invention to provide a simple, inexpensive method of securing a plastic lens to sports type lighting fixtures with non-front entry access to the light source, so as to provide greater security for the internal elements of the fixture from external weather conditions.

SUMMARY OF THE INVENTION

A light fixture and an improved method of making such which has a housing where maintenance of the light source is accomplished by entry from the side or rear, a radially outward projecting front flange, and a plastic lens that is secured preferably by a two-sided adhesive silicone transfer tape to the flange with a metal cored trim providing protection from the elements and further securing the assembly. The two-sided adhesive silicone transfer tape is placed on the flange and the plastic lens is positioned thereon with sufficient pressure to secure adhesion. A metal cored trim, preferably a metal cored and embossed vinyl covered flexible trim with inwardly protruding vinyl lips, is pushed over the plastic lens, flange and silicone tape assembly to further ensure adhesion. The assembly can be further secured by crimping the trim onto the fixture.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings:

FIG. 1 is an oblique view of a typical lighting fixture with rear entry means to access the light source.

FIG. 2 is a sectional view taken at Section line 2—2 illustrating a preferred embodiment of the present invention.

FIG. 3 is an enlarged sectional view of a preferred alternate embodiment of the connection of the lens with respect to the lighting fixture as shown in FIG. 1.

DESCRIPTION OF THE PREFERRED EMBODIMENT

Several qualities are necessary or highly desirable for the material of a lighting fixture window or lens. Not having one or more of these qualities or properties, eliminates, from a practical standpoint, many materials that might be otherwise assumed to be acceptable. Suitable materials should have all the following characteristics: be unbreakable and impact resistant; resistant to high temperatures beyond the range of use application, and especially be nonflammable, nontoxic and noncontaminating; possessive of a low coefficient of friction (and therefore be resistant to dust build-up); be translucent, and in some applications, be at least nearly transparent; be essentially inert to environmental conditions of use for prolonged periods of time and particularly be essentially immune to ultraviolet degradation when used with a lamp such as a fluorescent or mercury vapor lamp, which emits a large amount of such radiation; be possessive of good transmittance qualities over the full visible spectrum, and preferably well into both the ultraviolet and infrared ranges; and be at least cost-competitive with glass in the use dimension.

The material that has been discovered that exhibits all of the above properties appears to be Teflon FEP. Teflon is a registered trademark of E. I. duPont de Nemours, Inc. Teflon FEP is a fluorocarbon copolymer made by polymerizing a mixture of tetrafluoroethylene and hexafluoropropylene (which are a fluorinated ethylene and a fluorinated propylene). The properties of the final polymer can be varied slightly by changing the ratio of the two monomers.

It has been discovered that in addition to exhibiting all of the above qualities, Teflon FEP is meltextrudable so that thin-film production is readily accomplished. Teflon FEP is readily produced in thickness of 10 mm. and less. In fact, a 5 mm. thickness has been found to be the optimum thickness as a compromise between strength and transmittance for Teflon FEP. At this thickness the strength is still ample to resist tearing even upon accidental impact. On the other hand, it exhibits only a very, very slight bluish cast and is still essentially transparent. In fact, the transmittance of Teflon FEP at this thickness is greater than for one-fourth inch glass, the preferred thickness for glass which is subjected to tempering.

Teflon, and particularly Teflon FEP, is the most inert of all plastics known, and is virtually immune to all normal environmental conditions, including direct exposure to ultra-violet rays for prolonged periods of time. In addition Teflon FEP withstands temperatures from $-270°$ C. to $+205°$ C. In outdoor exposure testing in Florida there was no measurable change in the material in any regards after a 10-year test.

Teflon FEP is not the only Teflon material that is suitable, however. Teflon TFE may also be used, particularly where it is not a requirement that the lens be nearly transparent, such as where glazed or frosted glass would otherwise be used. Teflon TFE is a fluorocarbon homopolymer called polytetrafluoroethylene, tetrafluoroethylene (TFE) being a single monomer which is polymerized to give the polymer. Since it is the only monomer, the polymer is a homopolymer.

Teflon TFE has essentially all of the desirable properties of Teflon FEP except for its translucent quality. It is a milky white at thicknesses of approximately 5 mm. It is also a little more expensive to produce in sheet or lens form, since to produce sheets, it is normal to shave a solid block, rather than to merely extrude the material in sheet form, as with Teflon FEP.

Teflon FEP and TFE are both considered generically as fluorocarbon polymers and are known commerically as fluoroplastics. Other fluorocarbon polymers exhibiting qualities that would indicate they are acceptable as lens materials are Tefzel, which is a copolymer of ethylene and tetrafluoroethylene (referred to generically as ETEE); "Kel-F", which is polychlorotrifluoroethylene (CTFE) and polyvinylidene fluoride. In addition, polymethylpentene and polysulfone also exhibit temperature, optical and other characteristics that would indicate their acceptability as lens materials.

For purposes herein, "thin film" refers to any of the acceptable materials as discussed above used in conjunction with a lighting fixture as its lens or window material through which light emanates during operation.

Now referring to the drawings, and first to FIG. 1, one style of light fixture 10 is shown supported on post 12 by an articulated bracket 14. Post 12 also supports ballast 16 for achieving operation of the lamp within light fixture 10. A connection cord 18 between ballast 16 and the lamp within fixture 10 achieves electrical connection for this purpose.

Now referring to FIG. 2, a cutaway sectional view of the front portion of light fixture 10 is shown, including a radially outward projecting front flange 24 that is perpendicular to the plane of the opening of the fixture. An adhesive means, preferably a two-sided adhesive silicone transfer tape, hereinafter silicone tape 26, is applied to outside portion of the flange 24 in the direction opposite from the interior of the fixture. The thin film lenses described above have very low coefficients of friction, especially Teflon TFE and Teflon FEP, resulting in the use of silicone tape which is known to have strong adhesive qualities regarding these two materials preferably used as the thin film lenses in these types of fixtures. Thin film lens 22 is then attached thereto with sufficient force to cause adhesion. One method of creating such force is to place a die cut thin film lens 22 on a sponge rubber topped locating jig, positioning the lighting fixture housing 10 with the flange 24 down in the jig on top of the thin film lens, assuring uniform overlap around the fixture's perimeter, and then exerting sufficient downward pressure to cause adequate adhesion for the thin film lens to stick to the flange.

The above-described thin film lens, silicone tape, and flange assembly is then protected from weather damage, including water leakage, by covering the assembly with a metal cored trim 28. The metal cored trim exerts pressure on the thin film lens, silicone tape, and flange assembly to help secure the total assembly. This total assembly is then perferably further secured by a means such as crimping the metal cored trim onto the fixture, thereby also securing the silicone tape and thin film lens. Methods of crimping are well known in the art, such as by using a hydraulic press jigged for crimping.

Although the use of a silicone tape has been found suitable for use with an assembly including a thin-film lens, its use in the above manner has also been found suitable for securing a glass lens.

FIG. 3 illustrates an enlarged sectional view of an alternate embodiment of the connection of a thin film or glass lens, silicone tape, and flange with the metal cored trim. The thin film lens 22, silicone tape 26 and flange 24 are assembled in the same manner as described above. The metal cored trim 36 is embossed with a vinyl covering 34 giving the resulting metal cored and embossed vinyl covered trim flexible qualities. A plurality of vinyl lips 38 protrude inwardly on each side of the open ends of the metal cored and embossed vinyl covered flexible trim 32. These vinyl lips 38 act as grippers creating a frictional force. The trim and assembly can be further secured by the use of crimping in the same or similar manner described above and known in the art.

While a particular embodiment of the invention has been shown, it will be understood that the invention is not limited thereto, since many modifications may be made and will be apparent to those skilled in the art. For example, the metal cored trim could be secured to the thin film or glass lens, silicone tape, and flange assembly by a bonding agent such as glue. Likewise, some liquid or flexible bonding agent can be used to act as the adhesive means that initially bonds and cushions the thin film or glass lens with the flange.

What is claimed is:

1. An improved method of securing a plastic lens to a lighting fixture of the type which has a housing with nonfront entry means to access the light source, and which includes a radially outward projecting front flange, wherein the improvement comprises:

applying an adhesive means to the outside perimeter of the radially outward projecting flange;

uniting the plastic lens with the adhesive flange;

covering the edge of the united plastic lens and the flange with a metal cored trim; and securing the metal cored trim to the united plastic lens and flange.

2. An improved method of securing a plastic lens to a lighting fixture as described in claim 1, wherein the adhesive means is a two-sided adhesive silicone transfer tape.

3. An improved method of securing a plastic lens to a lighting fixture as described in claim 1, wherein the metal cored trim is a metal cored and embossed vinyl covered flexible trim.

4. An improved method of securing a plastic lens to a lighting fixture as described in claim 3, wherein securing the metal cored trim to the united plastic lens and flange is performed by using means including a plurality of inwardly protruding lips acting as grippers to create a frictional force.

5. An improved method of securing a plastic lens to a lighting fixture as described in claim 1, wherein securing the metal cored trim to the united plastic lens and the flange is performed by crimping the cored metal trim to the flange, thereby also securing the united plastic lens.

6. An improved method of securing a glass lens to a lighting fixture of the type which has a housing with nonfront entry means to access the light source, and which includes a radially outward projecting front flange, wherein the improvement comprises:

applying an adhesive means to the outside perimeter of the radially outward projecting flange;

uniting the glass lens with the adhesive flange;

covering the edge of the united glass lens and the flange with a metal cored trim; and securing the metal cored trim to the united glass lens and flange.

7. An improved method of securing a glass lens to a lighting fixture as described in claim 6, wherein the adhesive means is a two-sided adhesive silicone transfer tape.

8. An improved method of securing a glass lens to a lighting fixture as described in claim 6, wherein the metal cored trim is a metal cored and embossed vinyl covered flexible trim.

9. An improved method of securing a glass lens to a lighting fixture as described in claim 8, wherein securing the metal cored trim to the united glass lens and flange is performed by using means including a plurality of inwardly protruding lips acting as grippers to create a frictional force.

10. An improved method of securing a glass lens to a lighting fixture as described in claim 6, wherein securing the metal cored trim to the united glass lens and the flange is performed by crimping the cored metal trim to the flange, thereby also securing the united plastic lens.

* * * * *